(12) United States Patent
Day

(10) Patent No.: US 6,663,702 B1
(45) Date of Patent: Dec. 16, 2003

(54) PRINTING INK

(75) Inventor: Geoffery Paul Day, Broadstairs (GB)

(73) Assignee: Sericol Limited, Kent (GB)

( * ) Notice: Subject to any disclaimer, the term of this patent is extended or adjusted under 35 U.S.C. 154(b) by 0 days.

(21) Appl. No.: 10/130,723

(22) PCT Filed: Oct. 24, 2000

(86) PCT No.: PCT/GB00/04119

§ 371 (c)(1),
(2), (4) Date: Sep. 17, 2002

(87) PCT Pub. No.: WO01/36546

PCT Pub. Date: May 25, 2001

(30) Foreign Application Priority Data

Nov. 18, 1999 (GB) ............................................. 9927247

(51) Int. Cl.⁷ .............................................. C09D 11/02
(52) U.S. Cl. ............................... 106/31.27; 106/31.37; 106/31.6; 106/31.69
(58) Field of Search .......................... 106/31.27, 31.37, 106/31.6, 31.69; 523/160, 161; 524/556

(56) References Cited

U.S. PATENT DOCUMENTS

| | | | |
|---|---|---|---|
| 4,177,075 A | 12/1979 | Mansukhani | 106/30 |
| 4,525,215 A * | 6/1985 | Shioi et al. | 106/31.4 |
| 4,590,265 A * | 5/1986 | Bogan et al. | 536/63 |
| 5,091,004 A | 2/1992 | Tabayashi et al. | 106/22 |
| 5,710,195 A | 1/1998 | Subbaraman et al. | 524/31 |
| 5,755,860 A * | 5/1998 | Zhu | 106/31.15 |
| 5,889,083 A * | 3/1999 | Zhu | 523/161 |
| 6,010,564 A * | 1/2000 | Zhu et al. | 106/31.37 |
| 6,444,019 B1 * | 9/2002 | Zou et al. | 106/31.4 |
| 6,521,033 B1 * | 2/2003 | Iijima | 106/31.58 |

FOREIGN PATENT DOCUMENTS

| | | |
|---|---|---|
| EP | 0 314 403 | 5/1989 |
| EP | 424 714 | 5/1991 |
| WO | WO 94/03546 | 2/1994 |
| WO | WO 00/27935 | 5/2000 |

OTHER PUBLICATIONS

WPI Accession No. 1994–206743 9250 & JP 6145574 (Citizen) (abstract).
WIP Accession No. 1985–321684 9510 & JP 6022 6575 (Sumitomo) (abstract).

* cited by examiner

*Primary Examiner*—C. Melissa Koslow
*Assistant Examiner*—Veronica F. Faison
(74) *Attorney, Agent, or Firm*—Reed Smith LLP

(57) ABSTRACT

This invention concerns inks for use in ink-jet printers for printing on to impervious or non-porous substrates such as, for example, glass, ceramics, plastics such as, for example, polycarbonate, polyvinyl chloride, cellulose acetate butyrate, and metals. The inks comprise a resin and two solvents having different evaporation rates. The inks dry quickly without the need for heat.

18 Claims, No Drawings

PRINTING INK

CROSS-REFERENCES TO RELATED APPLICATIONS

This application claims priority of Great Britain Application No. 9927247.8 filed Nov. 18, 1999, the complete disclosure of which is hereby incorporated by reference.

This invention concerns inks for use in ink-jet printers. In particular, this invention concerns inks for use in ink-jet printers for printing on to impervious or non-porous substrates such as, for example, glass, ceramics, plastics such as, for example, polycarbonate, polyvinyl chloride, cellulose acetate butyrate, and metals.

In ink-jet printing, minute droplets of black or coloured ink are ejected in a controlled manner from one or more reservoirs or printing heads through narrow nozzles on to a substrate which is moving relative to the reservoirs. The ejected ink forms an image on the substrate. For high-speed printing, the inks must flow rapidly to replenish the printhead as ink is ejected. In order for the inks to flow rapidly, they must have a low viscosity, such as, for example, 20 centipoise at 30° C. The inks must also be resilient to drying or crusting in the reservoirs or nozzles. For these and other reasons, ink-jet inks are commonly formulated to contain a large proportion, such as, for example, around 90% of a mobile liquid vehicle or solvent. Unfortunately, ink-jet inks that include a large proportion of solvent cannot be touched after printing until the solvent has evaporated and the inks have dried. It is therefore advantageous for the liquid vehicle or solvent to evaporate from the surface of the print as quickly as possible. On porous substrates such as, for example, paper, drying principally occurs by penetration or absorption of the liquid into the substrate. On non-porous or impervious substrates the liquid or solvent cannot be absorbed to the same extent. The liquid vehicle or solvent can be absorbed by some non-porous substrates by molecular diffusion but the rate of absorption is so slow that it is impractical. To overcome these problems, it is common practice to use a volatile solvent such as, for example, methyl ethyl ketone or ethanol, as the liquid vehicle or solvent in an ink-jet ink, and to pass prints on non-porous substrates through a heated dryer to accelerate the evaporation of the solvent in the ink.

EP 0 314 403 discloses an ink for printing on vinyl substrates. The ink includes a carrier solvent which is a mixture of a lower alkanol and a lower ketone, each of which have less than 10 carbon atoms. Methanol and methyl ethyl ketone are given as specific examples. Unfortunately, these solvents are highly flammable, and methanol is also toxic. These solvents are also likely to evaporate in the printing heads, leaving behind crusts of the solid components in the ink, which results in partial or complete blocking of the heads. Blocked or partially blocked printing heads affect the quality of printing, and may require the printing to be stopped while the blocked nozzles are cleared.

European patent EP 0 424 714 discloses the use of a solvent dye colorant and two miscible non aqueous solvents, one being volatile and one being non-volatile. The solvent dye is less soluble in the volatile solvent and more soluble in the non-volatile solvent.

Other rapidly drying ink-jet inks for impervious substrates contain unsaturated monomers or oligomers which harden by ultra-violet irradiation. U.S. Pat. No. 5,270,368 discloses such an ink for printing on printed circuit boards. These compositions provide printed layers that are thicker than printed layers produced from inks containing a volatile solvent. This is disadvantageous when several colours are to be printed on the same sheet such as, for example, in trichromatic process printing. Moreover, it is difficult to find combinations of monomers and oligomers which do not give an ink with an unacceptably high viscosity. Compositions combining both materials cured by ultra-violet radiation and a solvent are described in EP 0 407 054.

Another solution to the problem of providing inks which dry rapidly on impervious substrates is to use so-called 'hot-melt', 'semi-solid' or 'sol-gel' compositions. These compositions are liquid in the printer head because it is heated to a temperature above ambient, but solidify on cooling after reaching the substrate. Such inks are described in European patents EP 0 307 933, EP 0 329 026, and EP 0 475 707. Like the ultra-violet hardened inks described above, these inks also commonly provide a thicker printed layer than produced from solvent-based compositions. They also can often exhibit poor adhesion to the substrate, and are vulnerable to smearing if the print is subsequently warmed.

The aim of the present invention is to provide an ink-jet ink that overcomes the above mentioned problems.

In accordance with the present invention there is provided an ink-jet ink comprising: a resin; a first solvent; and a second solvent; the first solvent having an evaporation rate that is higher than the evaporation rate of the second solvent, and being capable of dissolving more than 5%, preferably more than 15%, by weight of resin at 25° C.; the second solvent not being capable of doing this.

We have unexpectedly found a liquid ink-jet ink that is rapidly drying on impervious or non-porous substrates. We have done this by using a particular combination of resin and solvents. The combination required is:

(i) a film-forming resin;
(ii) a relatively fast-evaporating solvent which is a good solvent for that resin; and
(iii) a relatively slow-evaporating solvent which is a poorer solvent for that resin.

In the ink-jet ink the resin is more soluble in the first solvent than the second solvent, with the first solvent being more volatile than the second solvent.

The resin is preferably a thermoplastic resin.

The resin is preferably present in the ink-jet ink up to a limit of 12%. The resin is more preferably present in a range from 0.3 to 1.0%.

By 'good solvent' is meant a solvent in which it is possible to dissolve more than 5%, preferably more than 15%, by weight of the resin (i) at 25° C. By poorer solvent is meant one in which is not possible to dissolve more of the resin (i) in solvent (iii) than in solvent (ii) at the same temperature, and preferably one in which it is only possible to dissolve significantly less of the resin.

By 'relatively fast-evaporating' solvent is meant one with an evaporation rate between 15 and 45, preferably between 20 and 30, using as the standard butyl acetate=100. By 'relatively slow-evaporating' solvent is meant one with an evaporation rate at least 5 units lower than the relatively fast-evaporating one.

When this ink-jet ink is printed on an impervious substrate, it dries more quickly than would be expected from the known evaporation rates and boiling points of the solvents present. The solvents may therefore be chosen from those less inherently volatile than the ones in the prior art, and so be less likely to evaporate in the printing head, which causes clogging. The ink is also less flammable and safer in use than those including more volatile solvents. It is also not necessary to use a heat source to dry the inks of the present invention.

The film-forming resin is preferably a solvent-soluble thermoplastic resin. It may, for example, be an acrylic resin such as, for example, poly(methyl methacrylate), a vinyl resin such as, for example, a copolymer of vinyl acetate and vinyl chloride, or a cellulose resin such as, for example, cellulose acetate butyrate.

The ink preferably includes between 0.1 and 12%, more preferably between 0.3 and 1.0%, of the resin.

The choice of particular pairs of solvents useful in the present invention depends on the chemical nature of the resin. For example, if the resin is a polyacrylate, the relatively fast-evaporating solvent may be a lactate ester, such as, for example, ethyl lactate; and the relatively slow-evaporating solvent may be an ester of an aliphatic alcohol containing 5–10 carbon atoms with a monocarboxylic acid containing 2–4 carbon atoms, such as, for example, ethylhexyl acetate. The ratio of proportions of the two solvents in the ink preferably lies between 10:1 and 1:10, more preferably between 3:1 and 1:3. The total combined proportion of solvent in the composition is preferably between 70 and 98% by weight, more preferably between 85 and 95% by weight.

In addition to the resin (i) described above the ink also includes a film-forming resin to improve adhesion of the ink film to the substrate being printed. This resin must also be soluble in the solvents (ii) and (iii) at the concentrations used in the compositions. Its solubility is not subject to the restrictions stated above for the resin (i), though it is of course possible that the solubility of the two resins in the two solvents differs. Resin (iv) may be, for example, an acrylic resin, a vinyl resin, a polyvinyl butyral resin, or a cellulose resin, the choice being made from those with good adhesion to the substrate to be printed. For example, for printing on vinyl sheets the resin (iv) may be a vinyl copolymer. The proportion by weight of resin (iv) in the composition is between 0.3 and 10%, preferably 1–4%.

The ink-jet ink of the present invention also includes a colouring agent. The colouring agent is preferably a dispersible pigment, of the types known in the art and commercially available, for example, under the trade-names Paliotol (available from BASF plc), Cinquasia (available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used. The compositions do not contain as the principal colouring agent a dye soluble in the solvents present. The total proportion of pigment present is between 1 and 12% by weight, preferably 3–8%.

Other components of types known in the art may be present in the ink to improve the properties or performance. These components may be, for example, surfactants, defoamers, dispersants, stabilisers against damage by heat or light, reodorants, flow or slip aids, biocides and identifying tracers. The inks of the invention do not need to include monomers or oligomers hardenable by ultra-violet radiation, and also they do not need to be dried by irradiation with ultra-violet light.

The inks of the invention may be made by known methods such as, for example, stirring with a high-speed water-cooled stirrer, or milling on a horizontal bead-mill.

They inks are mobile liquids at room temperature, with a viscosity less than 50 centipoise at 30° C., preferably between 8 cP and 20 cP at 30° C. The inks have good adhesion on non-porous substrates and dry rapidly. They may also be used for ink-jet printing on porous substrates, for example paper or board.

The invention will now be described, by way of example, with reference to the following example (parts given by percentage):

EXAMPLE 1

The following were stirred rapidly on a water-cooled stirrer until no nibs were seen with a Heggman gauge.

| | |
|---|---|
| Ethylhexyl acetate | 46.83% |
| Ethyl lactate | 46.83% |
| Elvacite 2021 (acrylic resin from du Pont NV) | 0.84% |
| UCAR VYHH (vinyl copolymer resin from Union Carbide) | 1.50% |
| Microlith Blue 4G-K (pigment chip from Ciba) | 4.00% |

The ink-jet ink exhibited good adhesion to a vinyl substrate and dried without the need for any heat.

(NOTE: In this example the film-forming resin (i) was Elvacite 2021; the relatively fast-evaporating solvent was ethyl lactate; the slower-evaporating solvent was ethylhexyl acetate; and the film-forming resin with good adhesion was VYHH.)

What is claimed is:

1. An ink for use in an ink-jet printer, the ink comprising: a resin; a first solvent; and a second solvent; the first solvent having an evaporation rate of between 15 and 45 units using butyl acetate as the standard having an evaporation rate of 100 units and which is higher than the evaporation rate of the second solvent, and being capable of dissolving more than 5% by weight of the resin at 25° C.; the second solvent not being capable of dissolving more than 5% by weight of the resin at 25° C.

2. The ink of claim 1, wherein the first solvent has an evaporation rate of between 20 and 30 units, using butyl acetate as the standard having an evaporation rate of 100 units.

3. The ink claimed of claim 1, wherein the second solvent has an evaporation rate of at least 5 units lower than the evaporation rate of the first solvent.

4. The ink of claim 1, wherein the resin is a thermoplastic resin.

5. The ink of claim 4, wherein the resin is selected from the group consisting of acrylic resins, vinyl resins and cellulose resins.

6. The ink of claim 1, comprising from 0.1 to 12% resin.

7. The ink of claim 1, wherein the ratio of the first solvent to the second solvent is from 10:1 to 1:10.

8. The ink of claim 1, wherein the first and second solvents are present together in an amount from 70 to 98% by weight of the ink.

9. The ink of claim 1, wherein the ink further comprises a film-forming resin.

10. The ink of claim 9, wherein the film-forming resin is soluble in the first and second solvents.

11. The ink of claim 9, wherein the film-forming resin is selected from the group consisting of: acrylic resins, vinyl resins, polyvinyl butyral resins and cellulose resins, and has a solubility of greater than 5% in both solvents.

12. The ink of claim 10, wherein the film-forming resin is selected from the group consisting of: acrylic resins, vinyl resins, polyvinyl butyral resins and cellulose resins, and has a solubility of greater than 5% in both solvents.

13. The ink of claim 9, wherein the film-forming resin is present in an amount from 0.3–10%.

14. The ink of claim 1, which further includes a dispersible pigment.

15. The ink of claim 14 wherein the dispersible pigment is present in an amount from 1–12%.

16. The ink of claim 1, which has a viscosity of less 50 centipoise.

17. The ink of claim 1, which has a flash point of greater than 35° C. at standard pressure.

18. In a method for printing wherein an inkjet printer is used to deposit ink on a substrate, the improvement which comprises the ink being the ink of claim 1.

* * * * *